United States Patent
Kiib et al.

(10) Patent No.: US 12,345,232 B2
(45) Date of Patent: Jul. 1, 2025

(54) DETERMINING TOWER TOP ACCELERATION OF A WIND TURBINE

(71) Applicant: VESTAS WIND SYSTEMS A/S, Aarhus N (DK)

(72) Inventors: Kristian Kiib, Skødstrup (DK); Jon Sowman, Brockham (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/568,186

(22) PCT Filed: Jun. 3, 2022

(86) PCT No.: PCT/DK2022/050119
§ 371 (c)(1),
(2) Date: Dec. 7, 2023

(87) PCT Pub. No.: WO2022/258121
PCT Pub. Date: Dec. 15, 2022

(65) Prior Publication Data
US 2024/0271602 A1    Aug. 15, 2024

(30) Foreign Application Priority Data
Jun. 8, 2021  (DK) .............................. PA202170293

(51) Int. Cl.
*F03D 17/00*    (2016.01)
(52) U.S. Cl.
CPC ......... *F03D 17/009* (2023.08); *F03D 17/034* (2023.08); *F05B 2270/807* (2013.01)
(58) Field of Classification Search
CPC ..... F03D 7/02; F03D 17/034; F05B 2270/807
See application file for complete search history.

(56) References Cited

U.S. PATENT DOCUMENTS

| 10,767,628 B2 * | 9/2020 | Hovgaard | G05B 17/02 |
| 2019/0085823 A1 | 3/2019 | Hovgaard et al. | |

(Continued)

FOREIGN PATENT DOCUMENTS

| CN | 112412701 A | 2/2021 |
| CN | 112523942 A | 3/2021 |

(Continued)

OTHER PUBLICATIONS

Danish Patent and Trademark Office, 1st Technical Examination including the Search Report for Application PA 2021 70293 dated Nov. 23, 2021.

(Continued)

*Primary Examiner* — Christopher R Legendre
(74) *Attorney, Agent, or Firm* — Patterson + Sheridan, LLP (57) ABSTRACT

A method of determining tower top acceleration of a wind turbine is provided. The method includes receiving acceleration data from a plurality of acceleration sensors positioned in a nacelle of the wind turbine, including data indicative of a measured acceleration in a direction along at least one measurement axis of each respective acceleration sensor at a current time step. The method includes determining a predicted tower top acceleration of the wind turbine tower at the current time step, the predicted tower top acceleration being determined in dependence on a kinematic model of the wind turbine, and on a determined estimation of tower top acceleration at a previous time step. The method includes determining an estimated tower top acceleration of the wind turbine tower at the current time step by updating the predicted tower top acceleration based on the measured acceleration from each of the acceleration sensors.

19 Claims, 6 Drawing Sheets (56) References Cited

U.S. PATENT DOCUMENTS

2020/0011296 A1    1/2020  Caponetti et al.
2024/0271602 A1*   8/2024  Kiib ..................... F03D 17/00

FOREIGN PATENT DOCUMENTS

| EP | 1719910 A1 | 11/2006 |
| EP | 2458204 A1 | 5/2012 |
| EP | 2679810 A2 | 1/2014 |
| WO | 2017174090 A1 | 10/2017 |

OTHER PUBLICATIONS

PCT, Notification of Transmittal of The International Search Report and The Written Opinion of The International Searching Authority, or The Declaration for Application PCT/DK2022/050119 dated Sep. 12, 2022.

* cited by examiner

DETERMINING TOWER TOP ACCELERATION OF A WIND TURBINE

FIELD OF THE INVENTION

The invention relates to determining acceleration of the top of a tower of a wind turbine. In particular, the determination involves estimating acceleration at a current time step by updating a predicted acceleration, that is determined based on estimated acceleration from a previous time step and on a kinematic model of the wind turbine, using measurements from a plurality of wind turbine acceleration sensors.

BACKGROUND

It is important to be able to obtain accurate measurements of the acceleration of a wind turbine, in particular of the top of the wind turbine tower or of the wind turbine nacelle. This allows the wind turbine to be monitored for efficient and safe operation. For instance, acceleration measurements can be used to detect the onset of damage to wind turbine components, or when tower oscillations reach critical levels in certain wind conditions. Active damping of the tower top acceleration based on such acceleration measurements can lead to a saving on materials needed in the turbine, thereby providing a saving on cost and weight.

Known arrangements for measuring wind turbine tower acceleration may suffer from certain drawbacks. In one example, a wind turbine is provided with an accelerometer located at the top of a wind turbine tower, e.g. a two-axis accelerometer for measuring acceleration in fore/aft and side/side directions of the wind turbine.

Such an arrangement may be susceptible to yaw-induced vibrations in a case in which a yaw system of the wind turbine is not sufficiently lubricated, for instance, which can lead to inaccurate acceleration measurements. This arrangement may also suffer from DC offset or drift caused by imperfections in the components of the arrangement, which also reduces measurement accuracy.

Known arrangements may also only be suitable for use in a control domain of a wind turbine. Measurements in a control domain may be used to control the wind turbine to maximise power generating efficiency and reduce loading on turbine components. On the other hand, measurements in the safety domain may be used to determine when a safety controller of wind turbine needs to assume control of the turbine, e.g. to shut down the turbine. In order to be suitable for use in a safety domain, an arrangement may need to be resilient and robust to inaccuracies or failure of components.

It is against this background to which the present invention is set.

SUMMARY OF THE INVENTION

According to an aspect of the invention there is provided a method of determining tower top acceleration of a wind turbine. The wind turbine comprises a tower, a nacelle atop the tower, and a plurality of acceleration sensors located in the nacelle. The method comprises receiving acceleration data, from the plurality of acceleration sensors, including data indicative of a measured acceleration in a direction along at least one measurement axis of each respective acceleration sensor at a current time step. The method comprises determining a predicted tower top acceleration of the wind turbine tower at the current time step. The predicted tower top acceleration is determined in dependence on a kinematic model of the wind turbine that is based on a position and orientation of each acceleration sensor relative to a point defined as the top of the tower. The predicted tower top acceleration is also determined in dependence on a determined estimation of tower top acceleration at a previous time step. The method comprises determining an estimated tower top acceleration of the wind turbine tower at the current time step by updating the predicted tower top acceleration based on the measured acceleration from each of the plurality of acceleration sensors.

The predicted and estimated tower top accelerations may be determined according to a Kalman filter algorithm.

The predicted and estimated tower top accelerations may include linear accelerations of the wind turbine tower in at least one linear direction.

The at least one linear direction may include at least one of: a side/side direction of the wind turbine; a fore/aft direction of the wind turbine; and, an up/down direction of the wind turbine.

The predicted and estimated tower top accelerations may include torsional accelerations of the wind turbine tower in at least one torsional direction.

Each accelerometer may be a multi-axis accelerometer configured to measure acceleration along multiple mutually perpendicular axes. The received acceleration data may include data indicative of measured tower top acceleration along multiple measurement axes of each respective acceleration sensor at the current time step.

The point defined as the top of the tower may be in the nacelle.

The point defined as the top of the tower may be on an axis defined by the tower.

The method may comprise determining a weight for each respective measured acceleration from the plurality of acceleration sensors. The predicted tower top acceleration may be updated based on the measured acceleration from each of the acceleration sensors in accordance with their respective determined weights.

Determining the weight for the measured acceleration from one of the acceleration sensors may be based on a comparison between estimated tower top acceleration of the wind turbine tower at the previous time step and an estimate of tower top acceleration based on the measured acceleration from the respective acceleration sensor.

If the comparison indicates that a difference between estimated tower top acceleration at the previous time step and the estimate of tower top acceleration based on one of the acceleration sensors exceeds a predefined threshold, then the measured acceleration from said acceleration sensor may be omitted from the determination of estimated tower top acceleration.

The acceleration sensors may be embedded in respective nodes or controllers, of a control system of the wind turbine, distributed in the nacelle.

The control system may be a distributed control system comprising a communication backbone operable according to a Time-Triggered Ethernet (TTE) standard.

According to another aspect of the invention there is provided a non-transitory, computer-readable storage medium storing instructions thereon that when executed by one or more processors cause the one or more processor to perform a method as described above.

According to another aspect of the invention there is provided a control system for a wind turbine. The wind turbine comprises a tower, a nacelle atop the tower, and a plurality of acceleration sensors located in the nacelle. The system comprises a computer processor configured to receive acceleration data, from the plurality of acceleration sensors, including data indicative of a measured acceleration in a direction along at least one measurement axis of each respective acceleration sensor at a current time step. The processor is configured to determine a predicted tower top acceleration of the wind turbine tower at the current time step, the predicted tower top acceleration being determined in dependence on a kinematic model of the wind turbine that is based on a position and orientation of each acceleration sensor relative to a point defined as the top of the tower, and the predicted tower top acceleration being determined in dependence on a determined estimation of tower top acceleration at a previous time step. The processor is configured to determine an estimated tower top acceleration of the wind turbine tower at the current time step by updating the predicted tower top acceleration based on the measured acceleration from each of the plurality of acceleration sensors.

The control system may be a safety control system of the wind turbine.

According to another aspect of the invention there is provided a wind turbine comprising a control system as defined above.

BRIEF DESCRIPTION OF THE DRAWINGS

Examples of the invention will now be described with reference to the accompanying drawings, in which.

DETAILED DESCRIPTION

Figure 1:
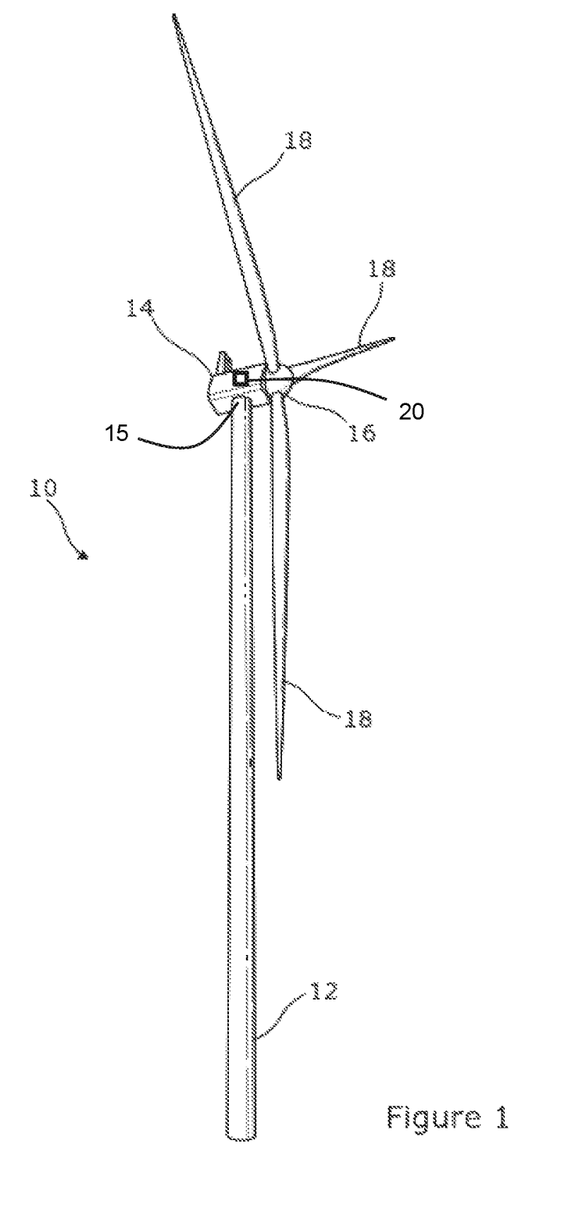
FIG. 1 is a schematic view of a wind turbine including a control system according to an example of the invention.

FIG. 1 shows a wind turbine 10 including a tower 12, a nacelle 14 rotatably coupled to the top 15 of the tower 12, a rotor including a rotor hub 16 mounted to the nacelle 14, and a plurality of wind turbine rotor blades 18—in the described example, three rotor blades—which are coupled to the rotor hub 16. The nacelle 14 and rotor blades 18 are turned and directed into the wind direction by a yaw system. The nacelle 14 houses generating components (not shown) of the wind turbine 10, including a generator, gearbox assembly (gear assembly or, simply, gearbox), drivetrain and brake assembly, as well as convertor equipment for converting the kinetic energy of the wind into electrical energy for provision to the grid. The wind turbine 10 is shown in its fully-installed form suitable for operation; in particular, the rotor hub 16 is mounted on the nacelle 14 and each of the blades 18 are mounted on the rotor hub 16.

The wind turbine 10 includes a control system 20 which, in this example, is located in the nacelle 14. With additional reference to FIG. 2, the control system 20 is a distributed control system including a plurality of distributed controller nodes (DCNs) 22 each including an accelerometer 24. The DCNs 22 are installed in different positions in the nacelle 14. In the described example, four DCNs 22 are included; however, it will be understood that any plurality of DCNs may be installed in the nacelle. It will also be understood that each DCN 22 may additionally include other types of sensor, e.g. gyroscopes, etc.

Figure 2:
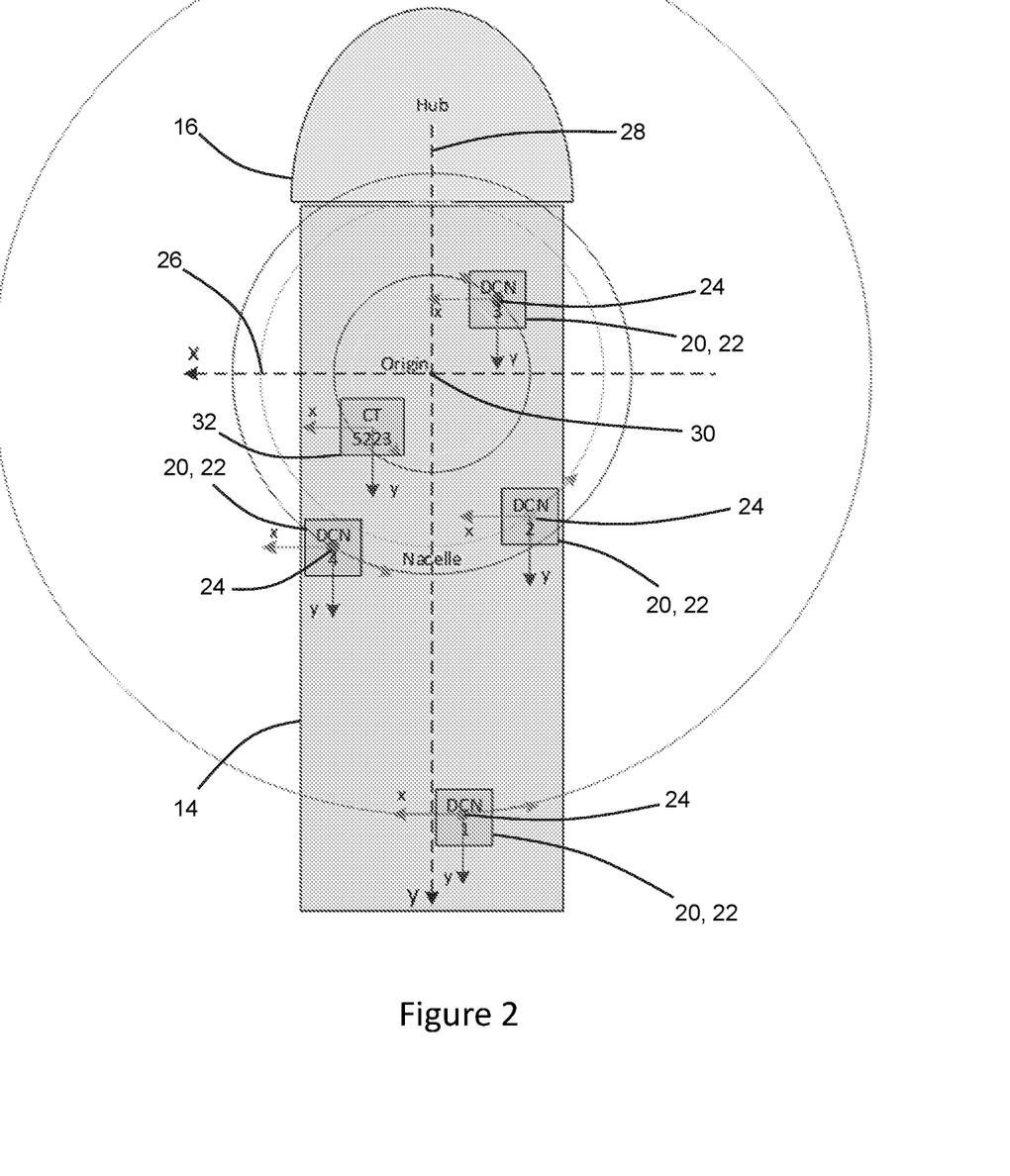
FIG. 2 is a schematic top view of the wind turbine of FIG. 1, showing a number of accelerometers of the control system of FIG. 1.

In the described example, each accelerometer 24 is arranged to measure acceleration in a side/side direction 26—i.e. x direction—and in a fore/aft direction 28—i.e. y direction—of the wind turbine 10, as illustrated in FIG. 2. Each accelerometer 24 may additionally be arranged to measure acceleration in an up/down direction (z direction) of the wind turbine 10, i.e. along an axis of the wind turbine tower 12.

A measure of acceleration at different points in the nacelle 14 may therefore be obtained via the accelerometers 24. However, the greater the distance each accelerometer 24 is from an origin point 30, the greater the influence of torsional movements of the nacelle 14 or top 15 of the tower 12 on the measured acceleration values. This is because the wind turbine 10 not only moves (i.e. oscillates, vibrates) linearly, but also exhibits twisting motion in one or more torsional directions about the origin point 30.

The origin 30 may be regarded as a point defining the top 15 of the tower 12 for the purposes of determining an acceleration of the tower top 15. The point 30 may be defined as being in the nacelle 14. The point 30 may be defined as being on an axis defined by the tower 12, i.e. approximately an up/down direction of the wind turbine 10, as this may be regarded as a point about which the wind turbine 10 oscillates or otherwise moves.

FIG. 2 shows how a previous accelerometer 32 of a wind turbine 10 may be positioned in the nacelle 14 in order to measure tower top acceleration. In particular, the previous accelerometer 32 is positioned relatively close to the origin 30 to try to minimise the effects of torsional movements on the measurements. As will become apparent below, there are no such constraints on the components, i.e. accelerometers 24, used to determine tower top acceleration according to the present disclosure.

Figure 3:
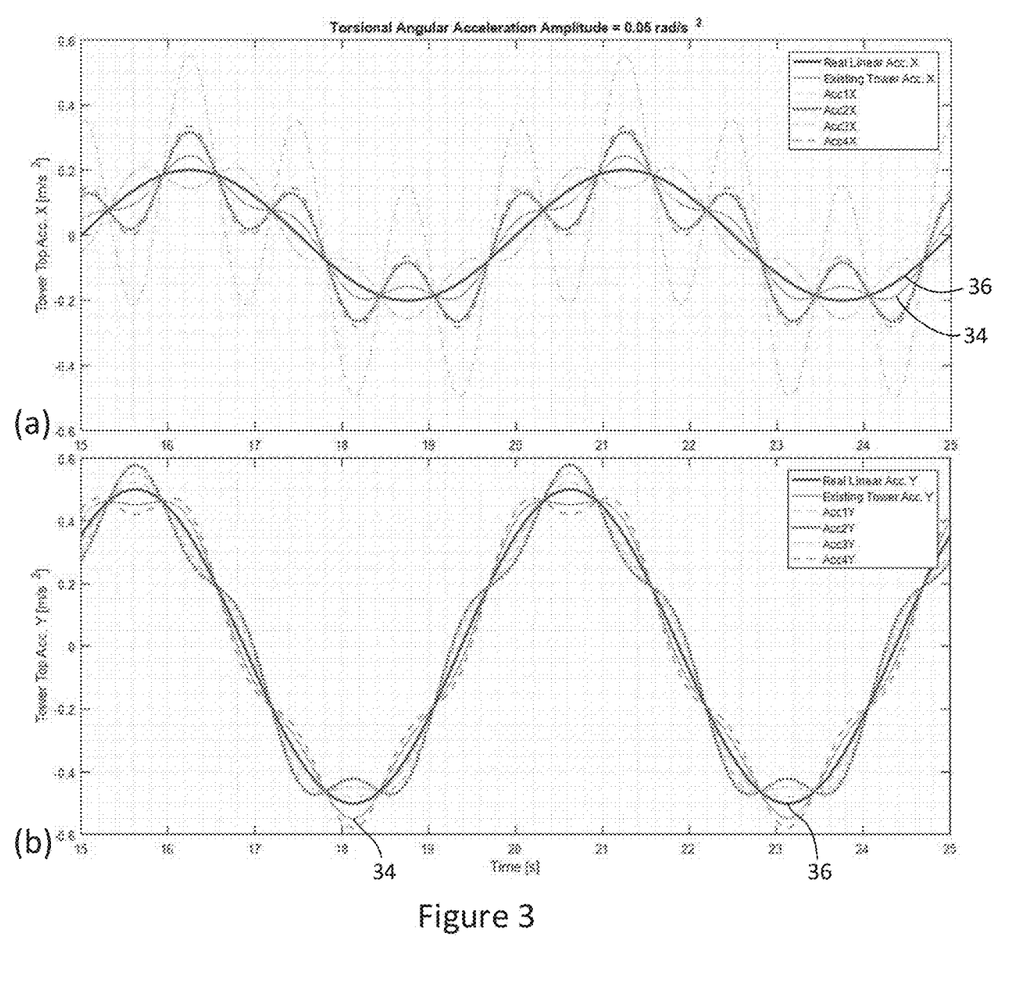
FIGS. 3(a) and 3(b) show acceleration measurements over time for the accelerometers of FIG. 2 in respective linear directions.

In general, the further from the origin 30 an accelerometer is positioned the greater the effect that torsional movement of the wind turbine 10 will have on the linear acceleration measurements obtained by the accelerometers. FIGS. 3(a) and 3(b) show plots of measured accelerations over time in the side/side and fore/aft directions 26, 28, respectively, of the four DCN accelerometers 24 and of the previous accelerometer 32, against the actual accelerations in these directions, when the wind turbine 10 experiences a torsional angular acceleration amplitude of 0.05 rad/s$^2$. The previous or existing accelerometer 32 is positioned closest to the origin 30 and the accelerometer 24 included in DCN1 is further from the origin 30 (as shown in FIG. 2). FIGS. 3(a) and 3(b) show that the linear acceleration measurements 34 of the previous or existing accelerometer 32 includes an error relative to the actual linear accelerations 36. However, this error is smaller than for the accelerometers 24, which are each positioned further from the origin 30 than the previous accelerometer 32. In particular, the greatest error is in the linear acceleration measurements 36 of the accelerometer 24 included in DCN1, i.e. the accelerometer 24 furthest from the origin 30.

Figure 4:
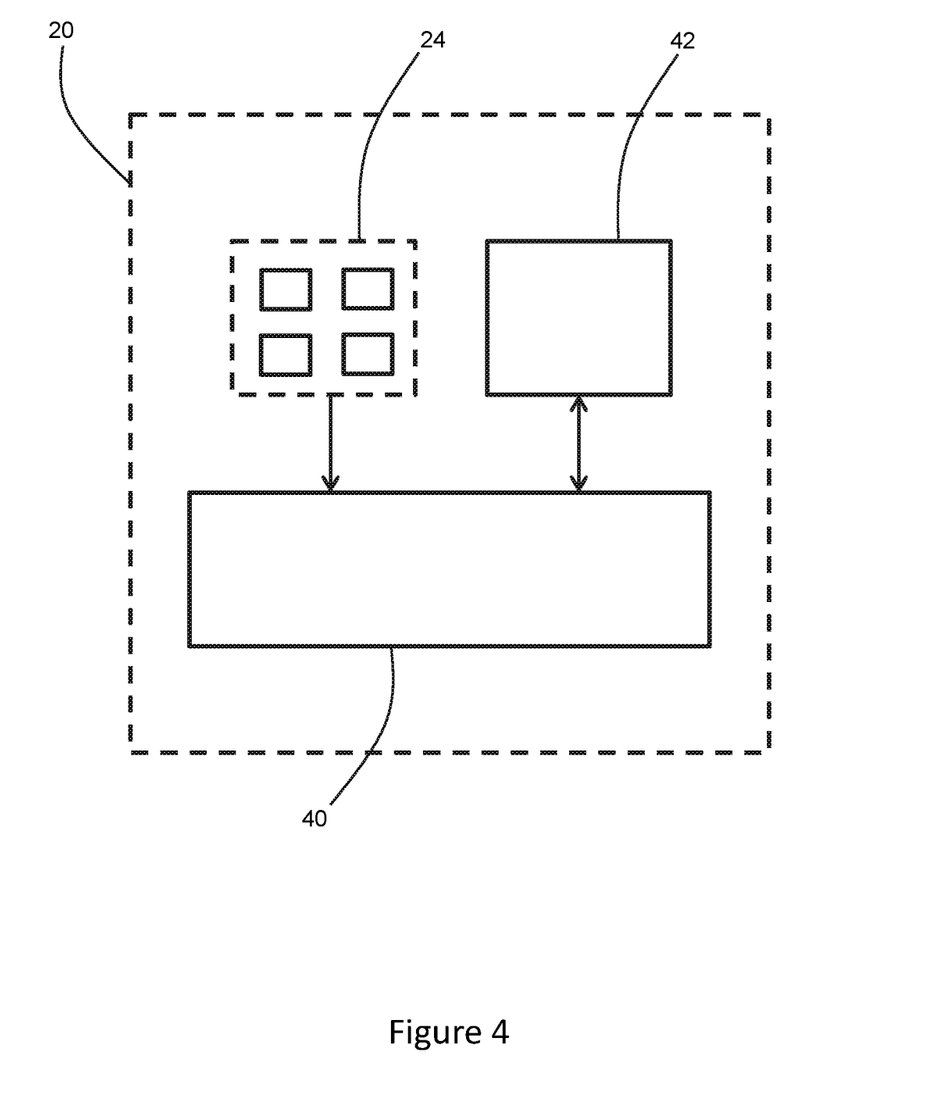
FIG. 4 is a schematic view of component parts of the control system of FIG. 1.

FIG. 4 illustrates different components of the control system 20. The system 20 includes the accelerometers 24 that are each included as part of a different one of the plurality of DCNs 22 (in this example, four accelerometers 24). The system 20 includes a controller 40 (that includes at least one processor) that receives measurements from the accelerometers 24. In the described example, the controller 40 is embedded in one of the DCNs 22 along with one of the accelerometers 24. In different examples, the controller 40 may be located in the nacelle 14 separate from the DCNs 22 or, in further different examples, the control system may be further distributed such that the controller is located in a different part of the wind turbine from the nacelle, or the controller may be located remotely from the wind turbine.

The controller 40 is for making various determinations based on the received accelerometer measurements or signals, including a determination of tower top acceleration of the wind turbine tower 12, as will be described in greater detail below. The controller 40 may be configured to transmit control signals to control different components of the wind turbine 10.

The control system 20 may further include a memory device 42 for storing instructions, where the processor of the controller 40 accesses the instructions in order to perform the various determinations. The memory device 42 may optionally include a data store for storing historical and/or current measurement values from the accelerometers 24.

The present invention is advantageous in that it provides a more accurate determination of acceleration of a wind turbine tower top or nacelle. The determination of the present invention is more resilient to yaw-induced vibrations. The determination of the present invention allows for compensation of torsional acceleration disturbances in linear acceleration measurements of individual wind turbine accelerometers, and also beneficially allows for determination of the torsional acceleration of the tower top or nacelle.

The present invention is also advantageous in that it provides a more reliable determination of acceleration of a wind turbine tower top or nacelle. In particular, the acceleration determination is robust against faults or failures that develop with individual components of the system, e.g. individual accelerometers. The present invention is advantageous in that it may provide a cost saving in that existing wind turbine hardware used for monitoring wind turbine motion may no longer be needed, e.g. a previous or existing accelerometer of the wind turbine, a shock sensor, etc.

Furthermore, the present invention is advantageous in that it provides a determination of acceleration of a wind turbine tower top or nacelle that is suitable for use in either a control domain or a safety domain of the wind turbine. As such, the invention provides a more flexible determination of acceleration. In particular, the increased robustness and reliability of the present invention means that it is suitable for use in a safety domain of the wind turbine.

Figure 5:
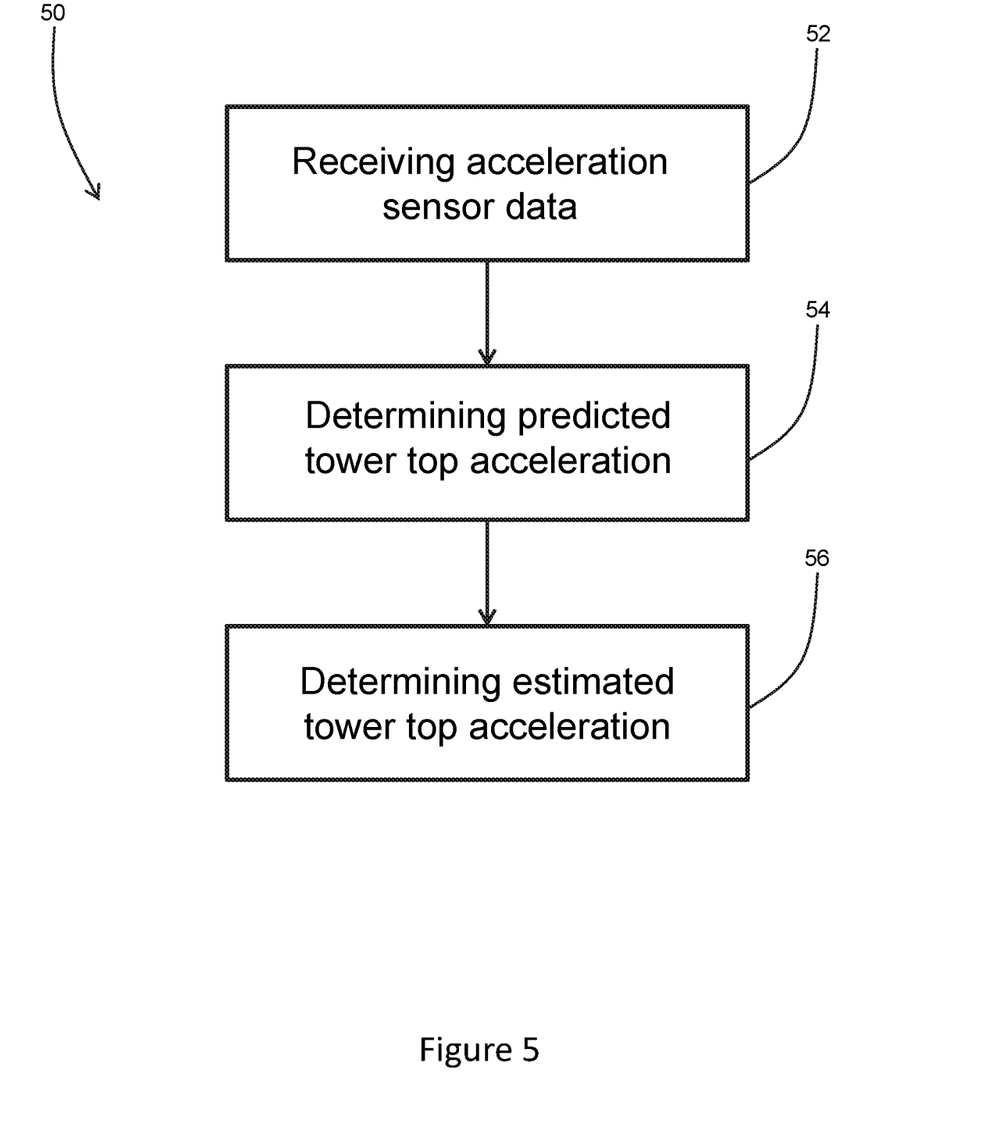
FIG. 5 shows the steps of a method performed by the control system of FIG. 1 in accordance with an example of the invention.

These and further advantages are achieved by using the control system 20 of FIGS. 1, 2 and 4 to perform the method 50 described below with reference to FIG. 5. In particular, the method 50 determines an estimation of tower top acceleration by using measured acceleration data from the plurality of accelerometers 24 to update a predicted tower top acceleration.

According to a first step 52 of the method 50 in accordance with the invention, the controller 40 receives sensor signals from each of the accelerometers 24. In particular, the acceleration data received by the controller 40 from the acceleration sensors 24 includes data indicative of a measured acceleration in a direction along at least one measurement axis of each respective acceleration sensor 24 at a current time step.

The accelerometers 24 may be oriented or positioned in the nacelle 14 such that their respective measurement axes correspond to the side/side and fore/aft directions 26, 28 of the wind turbine 10, and at least the measurements along the axes corresponding to these directions are received by the controller 40. If the accelerometers 24 are not oriented in this way, then knowledge of their orientation relative to these directions will allow the appropriate components from measurements along their measurement axes to be extracted for use in determining tower top acceleration in the desired directions, as will be understood by the skilled person.

By using measurements from a plurality of accelerometers 24 in the nacelle 14, the respective measurements can be combined to estimate linear accelerations of the tower top 15 caused by side/side and fore/aft motion of the tower top 15, and angular accelerations of the tower top 15 caused by torsional movement. In order that the measurements from the plurality of accelerometers 24 can be combined accurately, the acceleration signals from each DCN 22 are time synchronous. In one example, the distributed control system 20 may include a communication backbone operable according to a Time-Triggered Ethernet (TTE) standard to ensure time synchronicity.

At step 54 of the method 50, the controller 26 determines a predicted tower top acceleration of the wind turbine tower 12 at the current time step. In particular, the prediction is determined based on a previous estimation of tower top acceleration—i.e. the estimation at the previous time step—and on a kinematic model of the wind turbine 10 that is based on a position and orientation of each accelerometer 24 relative to the origin point 30.

At step 56 of the method 50, the controller 26 determines an estimated tower top acceleration of the wind turbine tower 12 at the current time step by updating the predicted tower top acceleration based on the measured acceleration from each of the plurality of accelerometers 24.

The prediction and estimation steps 54, 56 may be determined by means of a Kalman filter algorithm. Conventionally, use of a Kalman filter algorithm is beneficial in that it can combine (sensor) measurements and a dynamic model of a system to eliminate noise in the measurements and also modelling uncertainties. The method 50 of the present disclosure is different from the conventional approach. In particular, in the described method 50 a dynamic model of the wind turbine 10 is not used by the algorithm. That is, the algorithm does not have/need knowledge of the dynamics of the wind turbine 10.

Instead, in the described method only a kinematic model is needed that describes the positioning and orientation of the accelerometers 24 in the nacelle 14 with respect to a reference coordinate system (e.g. the x, y coordinates 26, 28, and optionally a z coordinate, centred at the origin point 30). Relative to a conventional application of a Kalman filter algorithm, the described method is beneficial in that no complex model of the wind turbine 10 is needed, of which variants would be needed for numerous combinations of wind turbine towers, rotor size, and weight/power ratings.

The use of the Kalman filter algorithm allows for linear and torsional tower top accelerations separately. This means that linear acceleration estimates that are free from torsional acceleration contributions/noise can be obtained, and torsional acceleration estimates can also be obtained. This provides the possibility that the control system 20 can take actions to control the wind turbine 10 based on torsional accelerations as well as linear accelerations of the tower top 15.

The quantities to be tracked in the Kalman filter can therefore include linear acceleration in one or more of the x, y and z directions, and/or torsional acceleration in one or more of the three directions. These quantities can be referred to collectively as the state $x:=[a_x, a_y, a_z, \ddot{\theta}_x, \ddot{\theta}_y, \ddot{\theta}_z]^T$, where $a_{x,y,z}$ linear tower top 15 side/side, fore/aft and up/down accelerations, and $\ddot{\theta}_{x,y,z}$ are the tower top torsional accelerations around the x, y and z axes, respectively.

The Kalman filter assumes that the state x at time k is evolved from the state at time k−1:

$$x_k = F x_{k-1} + w_k$$

where $w_k$ is the process noise assumed to be zero mean additive white Gaussian noise (AWGN), and F is the state transition model. In the described example, $F=I(n_{states}+n_{DIM}\cdot n_{IMU})$, where $n_{DIM}$ is the number of dimensions utilised from each accelerometer 24. In the described example, $n_{DIM}=3$ for the acceleration signals in each of the three dimensions. $n_{IMU}$ is the number of DCNs 22—or, specifically in this case, the number of accelerometers 24—in the nacelle 14, i.e. four in the described example.

At time k a measurement $z_k$ of the true state $x_k$ is made according to $$z_k = H x_k + v_k$$

where H is the observation model which maps the true state space into the observed space. H is constant and the dimensions are spanned by $[n_{DIM}\cdot n_{IMU} \times n_{states}]$. $v_k$ is the observed noise, which is assumed to be zero mean AWGN with covariance $R_k$. The H matrix is generated by noting that all motion of the nacelle 14 is considered to be captured by the quantities tracked in the state vector, i.e. linear and angular accelerations.

For an accelerometer 24 whose X, Y and Z measurement axes are aligned with the coordinate frame of the wind turbine 10 (see FIG. 2, for instance):

$$\begin{bmatrix} a_{local,x} \\ a_{local,y} \\ a_{local,z} \end{bmatrix} = \begin{bmatrix} 1 & 0 & 0 & 0 & r_y\sin(\alpha_y) & -r_z\sin(\alpha_z) \\ 0 & 1 & 0 & -r_x\sin(\alpha_x) & 0 & r_z\cos(\alpha_z) \\ 0 & 0 & 1 & r_x\cos(\alpha_x) & -r_y\cos(\alpha_y) & 0 \end{bmatrix} \begin{bmatrix} a_{tow,x} \\ a_{tow,y} \\ a_{tow,z} \\ \ddot{\theta}_{tow,x} \\ \ddot{\theta}_{tow,y} \\ \ddot{\theta}_{tow,z} \end{bmatrix} = Mx$$

where $r_{x,y,z}$ is the distance from the wind turbine coordinate system axes to the accelerometer 24, and $a_{x,y,z}$ is the angle between the wind turbine coordinate system axes and the accelerometer 24.

In general, a three-axis coordinate system may be rotated into another by means of a 3×3 rotation matrix R. The X/Y/Z measurements of an accelerometer 24 at arbitrary rotation may be given by $$\begin{bmatrix} a_{local,x} \\ a_{local,y} \\ a_{local,z} \end{bmatrix} = Hx = RMx$$

For the multiple accelerometers 24, the equations are duplicated for different rotation matrices R.

The prediction and update (estimation) steps 54, 56 as performed according to the Kalman filter algorithm may be outlined as follows.

The prediction step comprises a predicted state estimate $$\hat{x}_{k|k-1} = F_k \hat{x}_{k-1|k-1}$$

and a predicted error covariance $$P_{k|k-1} = F_k P_{k-1|k-1} F_k^T + Q$$

where Q is the covariance of the process noise. Q is a diagonal matrix spanned by the number of states $n_{states}$.

The update step comprises an innovation or measurement pre-fit residual $$\tilde{y}_k = z_k - H \hat{x}_{k|k-1}$$

and an innovation covariance $$S_k = R_k + H P_{k|k-1} H^T$$

where $R_k$ is a diagonal matrix spanned by $n_{DIM}\cdot n_{IMU}$. The construction of $R_k$ keeps tuning for noise and signal weighting separate. This may be handled by tuning $R_k$ for normal operation and then changing the diagonal terms dependent on the innovation $\tilde{y}_k$:

$$R_k = W_k R$$

where R is a tuned constant diagonal covariance matrix spanned by $n_{DIM}\cdot N_{IMU}$, and $W_k$ is a dynamic diagonal weighting matrix calculated at each time step.

Then, an optimal Kalman gain may be given by $$K_k = P_{k|k-1} H^T S_k^{-1}$$

The updated state estimate is given by $$\hat{x}_{k|k} = \hat{x}_{k|k-1} + K_k \tilde{y}_{k|k-1}$$

and the updated estimate covariance is given by $$P_{k|k} = (I - K_k H_k) P_{k|k-1} (I - K_k H_k)^T + K_k R_k K_k^T$$

The measurement post-fit residual is then given by $$\tilde{y}_{k|k} = z_k - H\hat{x}_{k|k}$$

Figure 6:
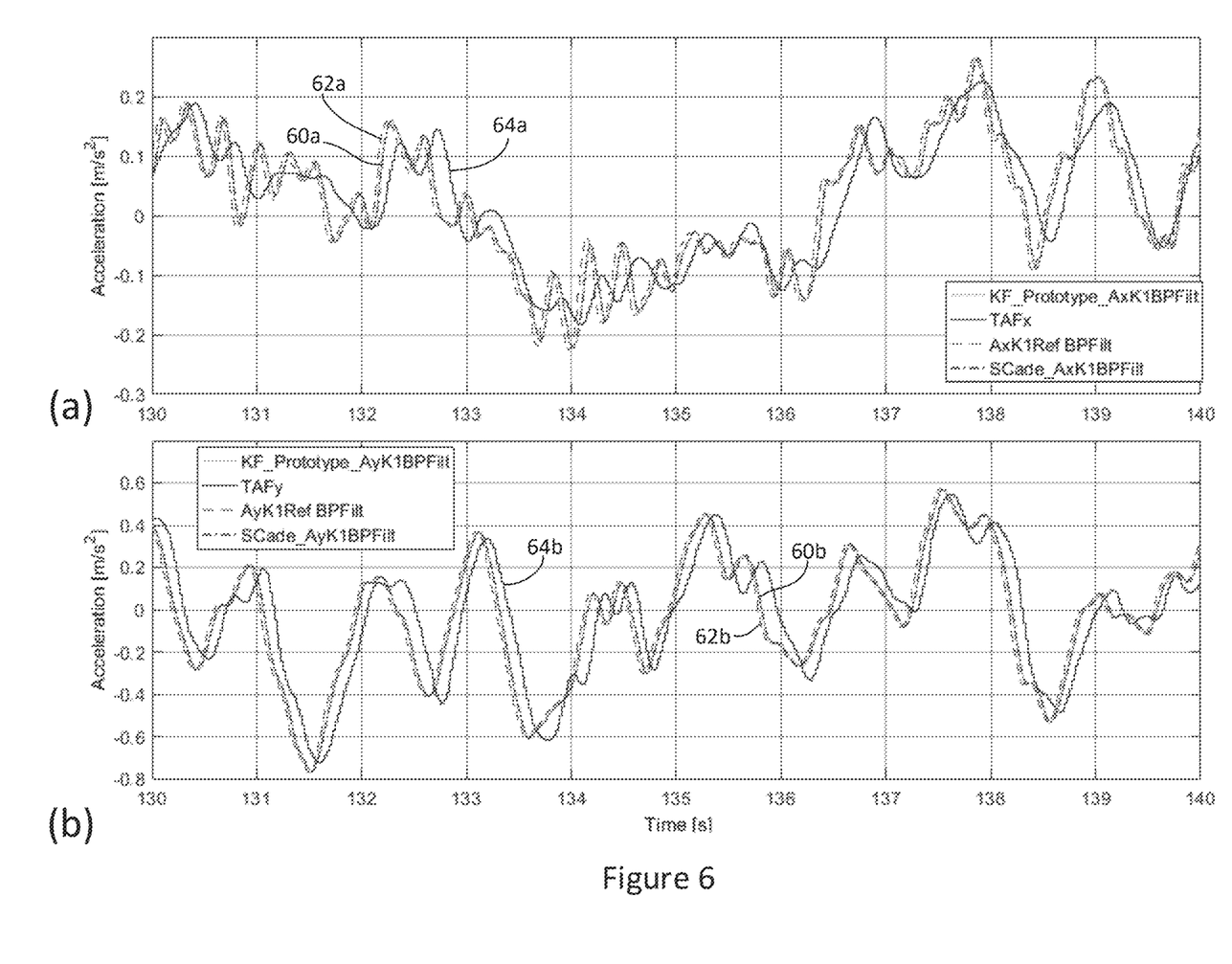
FIGS. 6(a) and 6(b) show plots of estimated tower top acceleration, determined according to the method of FIG. 5, in respective linear directions, relative to an actual tower top acceleration and to an estimated tower top acceleration determined according to a prior art method.

FIGS. 6(a) and 6(b) show plots of estimated tower top acceleration, determined according to the method 50, in the side/side and fore/aft directions 26, 28, respectively. In particular, these estimated accelerations are compared against the actual tower top accelerations, and also against the estimated tower top accelerations determined using the existing accelerometer 32. Specifically, the tower top accelerations 60a, 60b estimated according to the present method 50 show a reduced error relative to the actual or reference accelerations 62a, 62b compared to the tower top accelerations 64a, 64b determined using the existing accelerometer 32.

The arrangement and method of the present disclosure may allow for one or more faults in the system to be detected and/or isolated. This increased fault tolerance capability can contribute to the arrangement and system being suitable for use in a safety domain of the wind turbine 10. One or more fault detection techniques may be utilised in this regard.

In one example, a weighting may be applied to individual measurements from different ones of the accelerometers 24, i.e. to individual axes of the accelerometers 24, in order to determine a contribution from each accelerometer 24 to the estimation of tower top acceleration. The weightings can ensure that spurious or faulty measurements from one accelerometer 24 do not negatively impact on the overall tower top acceleration estimation.

These individual weighting factors may be dynamic and calculated at each timestep that the Kalman filter algorithm is executed, for instance. In particular, the weight for each measurement (accelerometer axis) may be set to be equal to the residual value in the pre-fit residuals vector $\tilde{y}_k$ (defined above), and limited by $w_{min}$ and $w_{max}$ weight limits, which may in turn be defined based on various parameters. Specifically, the weights may be expressed in the dynamic weighting matrix $W_k$ mentioned above, where $W_k$ is defined as follows:

$$W_k = \text{diag}\left(\min\left(\text{abs}\left(\frac{y_{weight}}{\min(y_{weight})}\right), w_{max}\right)\right)$$

where $w_{max}$ is the maximum allowed dynamic weight value in $W_k$, $y_{weight}$ is the weight of each measurement $y_{weight} = \max(\text{abs}(\tilde{y}_k), w_{min})$, and $w_{min}$ is the minimum allowed dynamic weight value in $W_k$.

This means that a measurement that does not fit the overall state estimates of the Kalman filter algorithm may be penalised in its weighting such that it immediately has less impact on the overall tower top acceleration estimation. Also, if a signal status that monitors dead signals or communication faults with the accelerometers 24 indicates that there is a fault with a measurement axis of a particular accelerometer 24, then the weight associated with that accelerometer axis may be set to $w_{max}$ so that the measurement associated with that axis contributes to the overall estimation as little as possible.

In another example, the measurements from each of the accelerometers 24 may be validated as follows. The measurement pre-fit residuals (as defined above) may be monitored individually with reference to a trigger threshold. In particular, when it is determined that a pre-fit residual exceeds the trigger threshold, then a count is started and incremented by a parameter-governed amount each time step that the threshold is triggered. If the count exceeds an upper threshold value, then a Boolean output may be set to true, indicating a fault in that particular measurement. When the trigger threshold is no longer exceeded the count may be decreased at a specific rate at each timestep. When the count falls below a lower threshold value (lower than the upper threshold value), the Boolean output may be reset to its default false state, indicating no fault.

The Kalman filter algorithm may not be able to operate reliably unless a certain number of the accelerometer measurements are in agreement with the overall state estimates (estimated overall tower top acceleration), e.g. at least half of the accelerometer measurements. Each accelerometer 24 may have a status signal per device, meaning that if one or more axes for a given accelerometer 24 has a signal status fault (as in the first example described above) or a trigger threshold fault (as in the second example described above), then that accelerometer 24 may be considered to be faulty by the system 20. This may be used to determine whether the state estimates of the Kalman filter algorithm can be trusted. As one example, at least one more than half of the accelerometers 24 may need to be considered valid in order that the overall tower top estimation is treated as valid. In the described example, there are four accelerometers 24, meaning that at least three would need to be valid for the overall estimate to be treated as valid. In an example in which six accelerometers are used, at least four would need to be valid for the overall estimate to be treated as valid.

As a summary of the fault detection and isolation approach of the system 20, the Kalman filter can isolate and exclude relatively minor, temporary discrepancies between individual sensor measurements and overall tower top acceleration estimates by means of the dynamic weighting matrix described above. If a residual or discrepancy persists, and is significant enough to breach the upper threshold mentioned above, then the relevant accelerometer 24 may eventually be treated as invalid. However, as outlined above, provided a sufficient number of the accelerometers are still valid, then the tower top acceleration estimation can continue to be validly and accurately determined even if one or more accelerometers are treated as invalid.

Many modifications may be made to the described examples without departing from the scope of the invention as defined in the appended claims.

Although in the described example, a Kalman filter algorithm is used to determine predicted and estimated tower top accelerations, in different examples a different algorithm may be used to determine these parameters.

The method of the invention may be implemented on any suitable computing device, for instance by one or more functional units or modules implemented on one or more computer processors. Such functional units may be provided by suitable software running on any suitable computing substrate using conventional or customer processors and memory. The one or more functional units may use a common computing substrate (for example, they may run on the same server) or separate substrates, or one or both may themselves be distributed between multiple computing devices. A computer memory may store instructions for performing the method, and the processor(s) may execute the stored instructions to perform the method. The computing device and/or memory may be partly or wholly located on site at the wind turbine or remote from the wind turbine.

The invention claimed is:

1. A method of determining tower top acceleration of a wind turbine, the wind turbine comprising a tower, a nacelle atop the tower, and a plurality of acceleration sensors located in the nacelle, the method comprising:
- receiving acceleration data, from the plurality of acceleration sensors, including data indicative of a measured acceleration in a direction along at least one measurement axis of each respective acceleration sensor at a current time step;
- determining a predicted tower top acceleration of the tower at the current time step, the predicted tower top acceleration being determined in dependence on a kinematic model of the wind turbine that is based on a position and orientation of each acceleration sensor relative to a point defined as a top of the tower, and the predicted tower top acceleration being determined in dependence on a determined estimation of tower top acceleration at a previous time step;
- determining an estimated tower top acceleration of the wind turbine tower at the current time step by updating the predicted tower top acceleration based on the measured acceleration from each of the plurality of acceleration sensors; and
- controlling the wind turbine based on the estimated tower top acceleration.

2. The method according to claim 1, wherein the predicted and estimated tower top accelerations are determined according to a Kalman filter algorithm.

3. The method according to claim 1, wherein the predicted and estimated tower top accelerations include linear accelerations of the tower in at least one linear direction.

4. The method according to claim 3, wherein the at least one linear direction includes at least one of: a side/side direction of the wind turbine;
a fore/aft direction of the wind turbine; and, an up/down direction of the wind turbine.

5. The method according to claim 1, wherein the predicted and estimated tower top accelerations include torsional accelerations of the tower in at least one torsional direction.

6. The method according to claim 1, wherein each one of the plurality of acceleration sensors is a multi-axis accelerometer configured to measure acceleration along multiple mutually perpendicular axes.

7. The method according to claim 1, wherein the point defined as the top of the tower is in the nacelle.

8. The method according to claim 1, wherein the point defined as the top of the tower is on an axis defined by the tower.

9. The method according to claim 1, wherein the method comprises determining a weight for each respective measured acceleration from the plurality of acceleration sensors, and wherein the predicted tower top acceleration is updated based on the measured acceleration from each of the acceleration sensors in accordance with their respective determined weights.

10. The method according claim 9, wherein determining the weight for the measured acceleration from one of the acceleration sensors is based on a comparison between an estimated tower top acceleration of the tower at the previous time step and an estimate of tower top acceleration based on the measured acceleration from the one of the acceleration sensors.

11. The method according claim 10, wherein when the comparison indicates that a difference between the estimated tower top acceleration at the previous time step and the estimate of tower top acceleration based on the one of the acceleration sensors exceeds a predefined threshold, then the measured acceleration from the one of the acceleration sensors is omitted from the determination of the estimated tower top acceleration.

12. The method according to claim 1, wherein the acceleration sensors are embedded in respective nodes, of a control system of the wind turbine, distributed in the nacelle.

13. The method according to claim 1, wherein the control system is a distributed control system comprising a communication backbone operable according to a Time-Triggered Ethernet (TTE) standard.

14. A control system for a wind turbine, the wind turbine comprising a tower, a nacelle atop the tower, and a plurality of acceleration sensors located in the nacelle, and the control system comprising a computer processor configured to:
- receive acceleration data, from the plurality of acceleration sensors, including data indicative of a measured acceleration in a direction along at least one measurement axis of each respective acceleration sensor at a current time step;
- determine a predicted tower top acceleration of the tower at the current time step, the predicted tower top acceleration being determined in dependence on a kinematic model of the wind turbine that is based on a position and orientation of each acceleration sensor relative to a point defined as a top of the tower, and the predicted tower top acceleration being determined in dependence on a determined estimation of tower top acceleration at a previous time step;
- determine an estimated tower top acceleration of the wind turbine tower at the current time step by updating the predicted tower top acceleration based on the measured acceleration from each of the plurality of acceleration sensors; and
- controlling the wind turbine based on the estimated tower top acceleration.

15. A wind turbine, comprising:
a tower;
a nacelle disposed on the tower;
a plurality of acceleration sensors located in the nacelle;
a control system configured to perform an operation, comprising:
- receive acceleration data, from the plurality of acceleration sensors, including data indicative of a measured acceleration in a direction along at least one measurement axis of each respective acceleration sensor at a current time step;
- determine a predicted tower top acceleration of the tower at the current time step, the predicted tower top acceleration being determined in dependence on a kinematic model of the wind turbine that is based on a position and orientation of each acceleration sensor relative to a point defined as a top of the tower, and the predicted tower top acceleration being determined in dependence on a determined estimation of tower top acceleration at a previous time step; and
- determine an estimated tower top acceleration of the wind turbine tower at the current time step by updating the predicted tower top acceleration based on the measured acceleration from each of the plurality of acceleration sensors; and
- controlling the wind turbine based on the estimated tower top acceleration.

16. The wind turbine according to claim 15, wherein the predicted and estimated tower top accelerations are determined according to a Kalman filter algorithm.

17. The wind turbine according to claim 15, wherein the predicted and estimated tower top accelerations include linear accelerations of the tower in at least one linear direction.

18. The wind turbine according to claim 17, wherein the at least one linear direction includes at least one of: a side/side direction of the wind turbine; a fore/aft direction of the wind turbine; and, an up/down direction of the wind turbine.

19. The wind turbine according to claim 15, wherein the predicted and estimated tower top accelerations include torsional accelerations of the tower in at least one torsional direction.

* * * * *